United States Patent
Ruehl et al.

(10) Patent No.: US 6,299,210 B1
(45) Date of Patent: Oct. 9, 2001

(54) MULTI-PIECE SIDERAIL FOR MEDIUM AND HEAVY TRUCKS

(75) Inventors: Phillip C. Ruehl, Elm Grove; Pete Szesterniak, Brookfield, both of WI (US)

(73) Assignee: R. J. Tower Corporation, Grand Rapids, MI (US)

( * ) Notice: Subject to any disclaimer, the term of this patent is extended or adjusted under 35 U.S.C. 154(b) by 0 days.

(21) Appl. No.: 09/630,483

(22) Filed: Aug. 2, 2000

(51) Int. Cl.$^7$ .................................................. B62D 21/02
(52) U.S. Cl. ........................................... 280/800; 280/785
(58) Field of Search .................................. 280/781, 800, 280/785; 296/203.01, 204

(56) References Cited

U.S. PATENT DOCUMENTS

| | | | | |
|---|---|---|---|---|
| 1,841,510 | * | 1/1932 | Van Ranst | 280/794 |
| 1,848,895 | * | 3/1932 | MacPherson | 280/800 |
| 2,090,461 | * | 8/1937 | Sherman | 280/781 |
| 2,119,193 | * | 5/1938 | Avery | 180/291 |
| 2,165,074 | * | 4/1939 | Sherman | 280/800 |
| 3,448,995 | * | 6/1969 | Stallard et al. | 280/124.106 |
| 3,580,611 | * | 5/1971 | McNitt | 280/433 |
| 3,904,380 | * | 9/1975 | Smith | 428/582 |
| 5,005,864 | * | 4/1991 | Chachere | 280/800 |
| 5,149,132 | | 9/1992 | Ruehl et al. | 280/800 |
| 5,308,115 | | 5/1994 | Ruehl et al. | 280/785 |
| 5,370,438 | * | 12/1994 | Mori et al. | 296/203.02 |
| 5,482,323 | * | 1/1996 | Hicks | 280/785 |
| 5,507,522 | * | 4/1996 | Ritchie | 280/800 |
| 5,609,386 | * | 3/1997 | Takahashi et al. | 296/204 |
| 6,099,194 | * | 8/2000 | Durand | 403/270 |
| 6,189,930 | * | 2/2001 | Kalazny | 280/781 |

* cited by examiner

Primary Examiner—Paul N. Dickson
Assistant Examiner—Deanna Draper
(74) Attorney, Agent, or Firm—Oppenheimer Wolff & Donnelly LLP (57) ABSTRACT

A multi-piece siderail is fabricated for use as a truck frame which has potential cost and weight reductions while also providing superior weight loading characteristics. Each section of the multi-piece siderail includes a webbed portion having longitudinal ribs that form alternating protruding and recessed sections. An upper and a lower flange are provided on each section and each flange is formed with a stepped, lipped configuration. The unique structure of each section provides increased rigidity and support to that section and also allows for a nesting arrangement between each of the three components. Furthermore, this structure provides multiple attachment zones throughout the frame—two zones on each flange and three zones on the front and rear section webs and five zones on the center section web. Each of these attachment zones are surrounded by a work hardened corner to provide reinforcement. To further increase strength and provide for sound joints, a support member is inserted between the middle component, which is often deeper, and the front and rear components. Specifically, the support member, having a Z-shaped cross-section, is inserted between the lower portions of the respective deep and shallow sections. Thus, a multi-piece siderail can be utilized in truck frame applications, allowing for reduced weight and reduced over all production costs, while providing superior performance characteristics such as greater payload and/or better fuel economy. The design also allows for potential section commonality and flexibility in assembly.

14 Claims, 7 Drawing Sheets

MULTI-PIECE SIDERAIL FOR MEDIUM AND HEAVY TRUCKS

BACKGROUND OF THE INVENTION

1. Field of the Invention

The present invention relates generally to truck frames. More specifically, the present invention relates to a multi-piece siderail (often a three-piece siderail) suitable for use in frames for medium trucks, heavy trucks, trailers, and other transportation equipment.

2. Description of the Related Art

Traditionally, vehicle frames or truck frames are composed of two siderails interconnected by a plurality of cross members. (It will be understood that the term truck frame, as used herein, relates equally to other vehicles and equipment frames such as those used in trailers, etc.) The truck frame then forms a foundation to which all other components are directly or indirectly affixed. Thus, the truck frame must be suitably strong and sufficiently rigid to not only support a relatively large amount of weight, but it must also retain its integrity as severe forces and stresses are applied during use. It might therefore seem logical to form the siderails from relatively thick, wide, heavy gauge steel beams. However, this is simply undesirable in most modern truck frames. The use of unduly rigid and thick steel for siderails greatly and unacceptably increases both the cost and the weight of the completed frame.

For some time it has been known to form each siderail of a truck frame from two separate pieces of steel. That is, each siderail is composed of separate steel members that are appropriately coupled to each other. This is a standard practice for fabricating frames used on light duty trucks. Light duty trucks are those trucks that are generally used for individual/personal use such as pick-up trucks, sport utility vehicles, or minivans. Typically, with a two-piece siderail, the joint of the siderail is located near the front seat of the cab or its equivalent. Thus, the front section of the siderail is used to support the engine and at least a significant portion of the cab. The rear section of the siderail supports a portion of the cab and the remainder of the vehicle.

As is well understood, there is a distinction between light duty trucks as one class of vehicles and medium or heavy duty trucks as a second class of vehicles. Often products for these different classes are produced by different manufacturers, using different manufacturing techniques, and in vastly different volumes. Some medium and perhaps some heavy duty trucks have employed a two-piece siderail in constructing the truck frame. For example, a commercial delivery van may be classified as a medium duty vehicle and could be formed using a variation of the two-piece siderail. Oftentimes, with heavy trucks, such as tractor trailers, the siderail is formed from a single piece of relatively heavy gauge steel. This is due to the increased weight and towing/loading capacities required by such vehicles. Alternatively, reinforced siderails have been used where an additional layer of metal is provided at various points to provide the prescribed strength or stiffness. These siderails have been designed to accommodate the high stresses typically generated in the center portion. Thus, the front and rear portions of these siderails are typically over-designed (e.g. capable of carrying loads that will never be experienced.) Due to the commercial nature of these vehicles, the increased cost in using heavy gauge single beam siderails has been accepted. Often these rails are straight in sideview and of constant section, requiring a high vehicle profile for axle travel—this, too has been accepted.

Sometimes a "doubler" of either "C" or "L" shape is used to reinforce and stiffen the center siderail and a portion of the rear siderail—but this add-on piece is usually constrained to the height of the base siderail, not enjoying the greater weight efficiency of a deeper section.

In certain circumstances a "drop-belly" (one-piece) rail is used to achieve greater efficiency. This design includes a rail having a relatively deep (high) center portion and shallower end portions. Manufacturing such a rail requires expensive contoured tooling that is adjustable for each of the many specialized wheelbases typical of medium and heavy truck applications. Furthermore, this design lacks a desired overlap at the high stress rear spring front hanger. While this drop-belly rail is the most weight-efficient of past-practice siderails, it also has by far the highest tool and unit costs, considering the many tool set-ups for low-volume application. Additionally, this design creates scrap material in the shallower front and rear sections.

A major improvement in light duty truck frames has been the ability to produce multi-piece siderails. This concept, as used in light duty truck frames, is more fully described in U.S. Pat. No. 5,149,132 to Ruehl et al. issued on Sep. 22, 1992 and U.S. Pat. No. 5,308,115, also issued to Ruehl et al. on May 3, 1994. Both patents are hereby incorporated by reference. With this multi-piece siderail design, the rear section is subdivided into two components. Since the front most section of the siderail often supports substantially less weight than the middle section, and the front and rear sections must accommodate appropriate amounts of axle or suspension travel, the front end section can sometimes be fabricated from lighter gauge material and both end sections can also have a smaller cross-section than the center section. In this design, the strength and stiffness requirements for the center section is not compromised. Maintaining this stiffness insures that the ride quality of the vehicle is maintained at a desirable level. Furthermore, the highest local stresses often occur at the solid front attachment of the rear suspension which must react to braking and acceleration loads—a convenient spot to overlap center and rear siderail sections of this invention. Thus locally doubling stock at that load point, while using the spring hangers' fasteners to create the rail joint is an efficient rail configuration. Joining these three independent sections provides a way to form a single siderail that meets or exceeds structural integrity for the application better than the traditional one or two-piece design, while also potentially reducing both the cost and weight. Due to these potential cost, weight, quality and ride performance benefits provided by multi-piece considerations, multi-piece siderails have become an industry standard and represent a large percentage of the light duty truck frames being produced today.

Despite the potential cost and weight benefits provided by a multi-piece siderail, this design has not been used in medium and heavy trucks. The siderails utilized for these applications are usually much longer than those utilized in light duty trucks. Also due to the nature of the vehicle, the siderails will be required to support far greater weight. Hence, longer and more rigid siderails are required and frame designers have been reluctant to investigate the three-piece siderail. Rather, the industry has relied on one-piece and in some cases two-piece siderails constructed from heavy gauge material and/or reinforced siderails. This presents little opportunity to modify the design and weight characteristics of the vehicle's frame. This also limits any opportunity to generate manufacturing efficiencies which could be achieved using common components for various frames.

As mentioned, medium and heavy truck frames typically handle much heavier loads. Consequently, the frame itself must be much larger. In one aspect, the height of the frame becomes much taller in order to handle these weight loads. Along with this increase in height comes a potential for localized buckling or "oil-canning"(i.e. deflection of the web). Heavy gauge steel has historically been used to avoid this potential problem, thus eliminating one important benefit of the multi-piece siderail (i.e. potential weight reduction). This creates yet a further reason why three-piece siderails have not been used in the medium or heavy truck market.

As mentioned above, the markets for light duty trucks and medium/heavy duty trucks are quite different. In addition to the varying load requirements, the volume and product mix is drastically different. In the medium/heavy duty truck market, much lower volumes are involved, thus not providing as much potential for economies of scale. Additionally, multiple configurations are often desired by the vehicle manufacturers. Consequently, manufacturing costs can be very substantial due to this market characteristic. Obviously, truck frames manufactured with single piece siderails make it very difficult to achieve any economies of scale. Consequently, any potential reduction in manufacturing cost is of great benefit.

Therefore, there exists a need to provide a multi-piece siderail system suitable for use in medium and heavy duty trucks that will provide the required degree of rigidity and support while potentially reducing the overall cost and weight of the frame. Further, there exists a need to provide a siderail that can be efficiently manufactured, possibly using common components to create a variety of particular frame designs.

SUMMARY OF THE INVENTION

The present invention provides two side-rails that are interconnected by a plurality of cross members, thus forming a completed frame. Each siderail is formed from multiple sections (typically three) that are integrally connected to form a unitary member. Since the overall siderail is made up of smaller components, fabrication costs can be greatly reduced. In addition, the unique arrangement of the three sections provides greater strength and rigidity due to its cross-sectional shape. Hence, thinner gauge and lighter weight materials can be utilized while still providing the required degree of structural integrity and rigidity. Such multi-piece siderails thus become economically and functionally desirable due to their potential for decreased production costs, decreased material costs, increased performance, decreased weight and fuel economy consumption, and increased design and manufacturing options/flexibility.

Utilizing shorter pieces in combination to form the siderail, smaller and more economical stamping or press machines can be utilized. These machines are more readily available and often much cheaper to operate, thus decreasing total overall production costs. The lighter, smaller sections are more easily handled—even man-handled by two operators. This helps to simplify and speed up the manufacturing process.

The use of multi-piece siderails in the medium/heavy truck market affords several other manufacturing efficiencies. More specifically, this allows for standardized components which can be easily combined to create multiple designs (i.e., a modular approach). For example, more complex standardized front sections can be combined with simpler specialized center sections to create a specific design. Thus, a specific frame configuration can be achieved as desired by a customer. However, because a standardized front section is being used, these components can be manufactured in larger quantities to achieve economies of scale.

Different sections of the siderail have different requirements. For example, each section will be required to support differing amounts of weight and hence will be required to withstand differing loads. Further, each section may have different torsional load requirements. The center section supporting the payload and spanning the wheelbase, traditionally needs to be more rigid in vertical beaming in order to reduce deflection. Hence, this section—with no axle-travel clearance requirements—is formed as a relatively deep open member from lighter gauge materials. That is, when completed, the middle section of the siderail will have a relatively large vertical dimension. This deep section of siderail is formed by pressing, bending, rolling, extruding or otherwise forming that member so that an upper and a lower flange are formed at each extremity. The portion of the planar member remaining between the upper and lower flange is the web portion of the section. This generally C-shaped configuration (i.e., having perpendicular flanges extending from an upper and lower potion of the support member) has been used in multi-piece siderails in the past. However, this configuration (generally C-shaped) alone, especially with the deep, lighter gauge center section, would not provide sufficient support for use in a medium or heavy truck frame. A C-shaped beam made from light gauge steel will have a tendency to suffer from "oil canning" or other structural fatigue or elastic/plastic collapses when the web is relatively large (deep) and the gauge is reduced.

To produce the necessary level of strength, the deep center section can be formed to include stepped, lipped flanges as well as one or more web ribs extending longitudinally along the length of the center section. The stepped portion is fabricated by deforming the flange so that two separate portions of the flange extend perpendicularly from the web, but are in different planes. A crease or bend separates the two flange portions such that one portion is shifted or offset from the other portion of the flange. This shifted portion is also aligned perpendicular to the web, however, is offset from the first portion. That is, the first portion and the shifted portion exist in separate but parallel planes. This creates a "stair-step" type configuration.

The lip of the flange is formed by rolling or bending a terminating portion of the flange so that it is at a predetermined angle with respect to the stepped flange. In production, this configuration can be achieved by rolling, pressing, bending, stamping, weldment of, or extrusion of the material.

The stepped, lipped flanges provide two fastener-attachment zones on both the top and bottom flanges where any rivet or bolt in the center of the zone will have a work-hardened ridge on each side to resist fatigue. Furthermore, a fastener head on the outboard step (top flange) can not protrude above the inboard step—due to a requirement for a smooth continuous surface to attach a $5^{th}$ wheel, or crossbar, or cab, or other structure to the flange as well as web. In current practice, fasteners are rarely used on flanges because of fear of fatigue crack to edge of flange and to keep a smooth top flange. Adding flange attachment points permits much more rigid attachment for brackets and cross members while spreading the attachment stress into multiple planes (using shear as well as tension or compression). The "lips" extending down from the top flange and up from the bottom flange transform the high stress outer fiber from a fatigue-sensitive fissured blank edge to a fatigue-resistant work-hardened corner. This flange shape also is very resistant of elastic buckling. The stability permits longer, thinner flanges so that more of the rail material is furthest from the rail centroid both under lateral and vertical loading (proportional to the cube of the centroidal distance). The multi-plane cross member and bracket attachment also greatly enhances torsional stiffness. These features have been demonstrated in the many light truck applications.

Ribs are formed into the web in a similar fashion. That is, the planar section of the web is transformed so that a plurality of parallel sections are formed wherein adjacent sections are offset from one another. While each of the adjacent sections are parallel they exist in different planes. Once again these ribs can be formed by stamping, rolling, extruding or pressing the raw material. While various configurations can be employed, in the preferred embodiment the front and rear web will include one rib, while the center will have two ribs. These ribs greatly reduce the tendency to buckle or oil can. These ribs will also create multiple fastener-attachment zones—three each on the front and rear webs and five on the center web—where any rivet or bolt at the zone center will have a work-hardened ridge above and below it to resist local fatigue. Together these features will permit lighter gauge material to take advantage of the greater bending efficiency of the deep sections.

The remaining sections of the siderails have many of the same structural features as the center section. That is, both the front and rear section of the siderail will include a stepped, lipped flange as well as including a rib in the central web. However, since neither the front nor rear sections need to support the same bending movements as the center section, they need not have the same vertical dimensions. Furthermore, their depth is limited by suspension or axle travel. In the preferred embodiment, both the front and rear section will include one rib that is medially disposed along the web portion of the section.

The ribs are specifically designed so that the particular ribs of the front or rear rail will mate with one of the ribs located on the center section of the siderail. Furthermore, the lower web portion of the front and rear sections is dimensioned such that it nests between the ribs of the deep center section. An upper flange of both the front and rear section is configured similar to the upper flange of the center section. Thus, when properly positioned, the upper flanges of the front and/or rear section will nest within the upper flange of the deep center section. Similarly, the lower flanges could be mated with the lower flange of the center section, if so desired.

Additionally, the torsional stiffness of the front section, under hood and cab, contributes to better driver comfort, and thus to his endurance, on long runs. Therefore a boxed section, even an aluminum extruded box section for very low tooling cost and very low weight, might be considered for this smallest and lightest of the three rail sections. A boxed section is also easier to tune for "accordion" collapse and energy absorption in barrier crash.

The rear section must also be shorter to clear suspension travel, but it shares support of the payload with the center section—thus requiring comparatively heavy gage/high strength steel. Torsional stiffness is less significant to driver comfort than in the front. Thus a less expensive open section would be best.

Any appropriate fastener may be used to secure the front and rear section to the center section such as utilizing bolts, rivets, crimping or welding. When so secured, a portion of the front and rear section will extend into the center section, thus forming an area of overlap. It is in this area of overlap that the two sections are attached to one another. Since there is often a substantial difference in the dimensions of the various components (due to variations in rail height), a gap is formed between the lower flange of the center section and the lower flanges of the front or rear sections. Rather than simply relying on the web and top flange attachment mechanism (bolts, rivets, welds, etc.) a support member is inserted between the lower flange of the center section and the relevant lower flange of either the front section or the rear section. Optimally, this support is configured in the shape of a Z-bar. That is, the support has a generally vertical main body with an upper support arm extending in one direction perpendicular from the main body, and a lower support arm extending perpendicularly from the main body in a direction opposite that of the upper support arm. Thus, when properly positioned the lower support arm of the Z-bar is firmly engaged against the lower flange of the deep center section. The upper support arm of the Z-bar is in contact with the lower flange of either the front section or the rear section. This creates a boxed section at this portion of the frame—a structure that imparts considerable strength and rigidity.

By providing both the stepped, lipped flange as well as the ribs extending along the webs of the various sections, dramatic increases in strength and rigidity are achieved for each of these sections. Thus, it becomes possible to use even lower gauge materials to form siderails while providing strength and yield characteristics exceeding traditional siderails. The use of lighter gauge materials is extremely advantageous in that significant weight and cost reductions can be achieved, as well as better fuel economy and/or greater payload.

Various dimensional requirements also exist for each section of the frame. The center section is required to carry the largest bending load. In order to utilize lighter gauge material, the vertical portion of the center section must remain relatively deep. Correspondingly, the front and rear sections must have relatively shallow vertical center sections in order to properly accommodate the front and rear axle travel. Thus, the multi-piece siderail of the present invention is extremely advantageous in that it allows for potential reductions in weight and/or cost by using lower gauge materials while maintaining the desired dimensional requirements of each portion.

The use of the stepped, lipped flange as well as the ribs along the webbing also advantageously provides a superior mechanism for joining the various cross members and brackets required to form a completed frame, as well as superior attachment points for mounted systems (e.g. steering gear, fuel tank, battery box, etc.). Namely, the supports for the cross members are configured to mate with the corresponding sections of siderail. In addition, where appropriate, the cross member or other attachment mechanisms can be coupled to the siderails at the point of overlap between the sections and the siderail. Thus, increased strength is achieved at these attachment points by doubling or tripling the thickness of material, while the attachments might also serve to join the siderail sections at no added cost.

The "stepped, lipped" flanges and the "ribbed" webs will input a considerable amount of strategically placed work-hardening throughout the rail sections. In some cases this may permit use of less expensive low-carbon steels. Further, for lighter gauge sections more expensive high-strength-low-alloy steels (H.S.L.A.) can be used while achieving the same finished strength. In other cases, H.S.L.A. steels may be substituted for die-quenched material permitting processing and equipment savings. In further situations, aluminum may be sufficient for the front section, where front axle loads are often one half to one third that of rear axle loads. This might permit simple extruded sections under the cab—even boxed extrusions, giving much higher torsional resistance. These extruded sections can be produced at much lower tool costs than similar stampings. Alternately, steel boxed weldments might be used in front for stiffness, while open "C" channels would suffice for center and rear sections. Together smaller presses, smaller parts and avoidance of heat-treat equipment may permit small remote frame manufacturing plants near the O.E.M. vehicle assembly plant—reducing the transportation costs and complications.

Another added feature is that the complex mounting structures required for the steering gear, front sheet metal, cab, engine, and front suspension mounting can often be confined to the front siderail section—often of common length for all truck "family" members. Likewise the rear siderail section containing rear suspension attachment is often restricted to one or two lengths. Variance in models are often confined to the relatively simple center rail where the myriad wheelbase shifts can be handled. Together, these requirements suggest the use of common front and rear rail sections for a "family," or even front and rear stub frame assemblies joined by relatively simple center rail sections. This, in turn, may enable outsourcing of complete or partial frame assemblies—thus simplifying vehicle assembly plants—and perhaps eventually leading to complete chassis modules or at least partial modules.

It is an object of the present invention to provide a multi-piece siderail system for use in medium and heavy truck frames.

It is yet another object of the present invention to provide interlocking siderail members from light gauge material, having sufficient strength and rigidity for use in vehicle frames.

It is another object of the present invention to provide a multi-piece siderail system wherein a middle section has relatively large vertical dimensions in comparison to the front and rear sections.

It is still another object of the present invention to provide siderail components having a stepped, lipped flange.

It is a further object of the present invention to provide a multi-piece frame with increased stiffness, thus improving ride performance.

It is still a further object of the present invention to provide a multi-piece siderail system wherein each component has longitudinally extending ribs.

DETAILED DESCRIPTION OF PREFERRED EMBODIMENTS

Figures 1, 2:
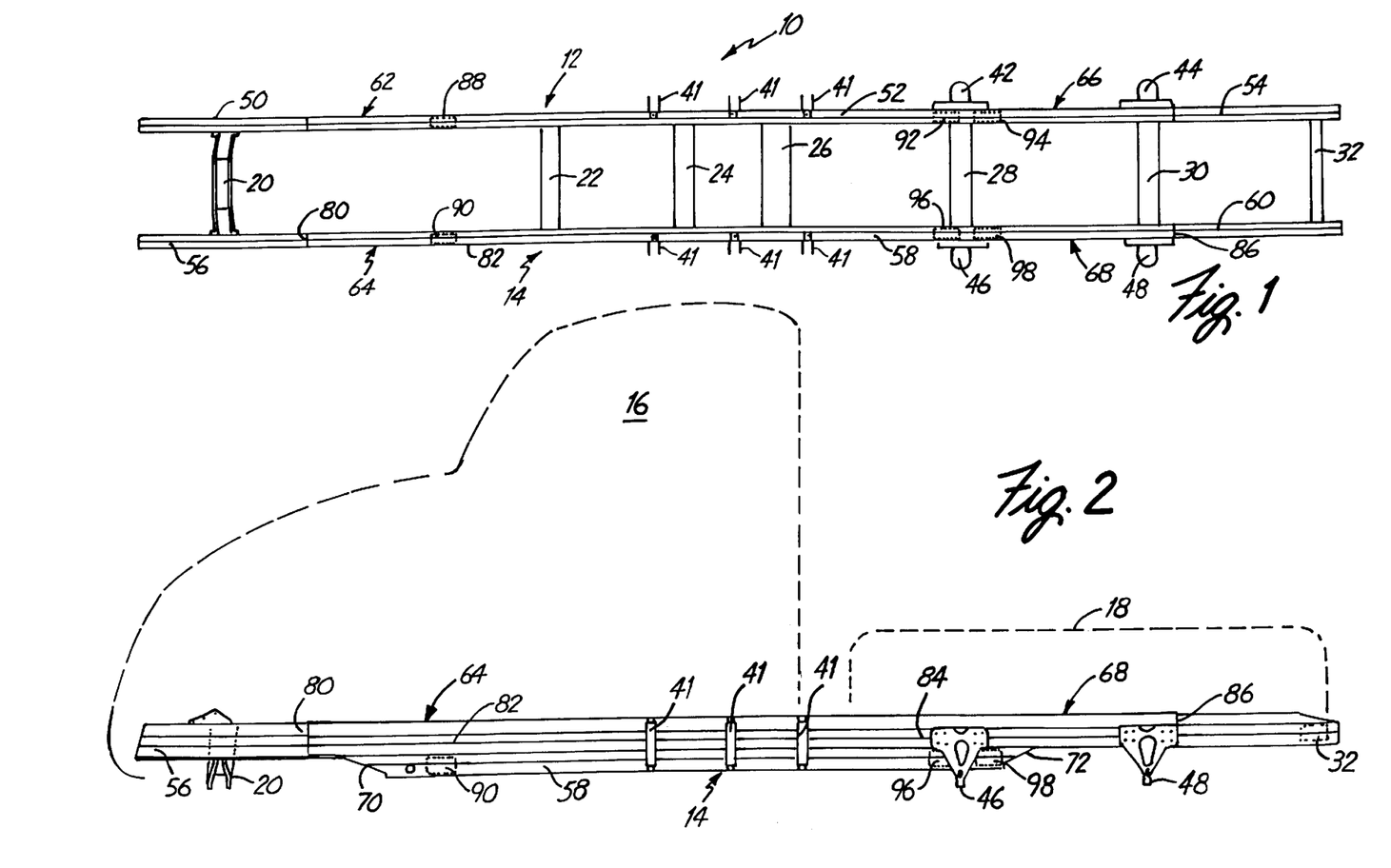
FIG. 1 is a top planar view of a truck frame constructed from the three-piece siderails of the present invention.
FIG. 2 is a side planar view of a three-piece siderail with a representative front cab and rear load member shown in phantom.

Referring to FIGS. 1 and 2, a truck frame according to the teachings of the present invention is shown and generally referred to as 10. Truck frame 10 is formed from right siderail 12 and left siderail 14 which are interconnected by a plurality of cross-members 20, 22, 24, 26, 28, 30, 32. In addition to joining right siderail 12 and left siderail 14, the various cross members 20, 22, 24, 26, 28, 30, 32 serve various independent functions. For example, cross member 20 also acts as a primary support for the engine once truck frame 10 has been formed. FIG. 2 illustrates the relative positions of a front cab 16 and a rear load member 18. Front cab 16 will include the passenger cab as well as the engine, while rear load member 18 can be in various forms depending upon the nature of the vehicle. For example, in a tractor-trailer configuration, rear load member 18 would be the attachment mechanism for the fifth wheel. In various medium duty vehicles, rear load member 18 may be a flatbed or an enclosed compartment and may be integral with front cab 16. Front cab 16 is attached to truck frame 10 through the use of a plurality of cab supports 40. (See FIG. 4 for an illustration of a cab support.) Cab supports 40 are positioned at suitable points along the truck frame 10 and form a mounting platform to attach the front cab 16. Many other attachment brackets/supports may be necessary, including fuel tank attachment brackets 41 (See FIGS. 1 and 2).

Referring again to FIG. 1, generally illustrated towards the rear of truck frame 10 are a first right front spring hanger 42, a second right front spring hanger 44, a first left front spring hanger 46, and a second left front spring hanger 48. The front ends of various springs or suspension members (not shown) would typically be coupled to the numerated spring hangers and thus interconnected with the axles of the vehicles. The arrangement illustrated would be applicable to a tractor having two rear axles. Alternative configurations are contemplated to accommodate vehicles having more or less axles.

Described below are further details regarding left siderail 14. It is to be understood that right siderail 12 is substantially similar and most of the description below applies equally to both siderails 12 and 14. Referring primarily to FIG. 2, left siderail 14 includes left front section 56, left center section 52, and left rear shallow section 60. Each of these sections is formed from an elongated piece of sufficiently rigid material, such as steel. The steel member is stamped, pressed, extruded, rolled or otherwise formed into the proper configuration.

The various sections are fabricated to nest against one another. Right front section 50 will nest with right center section 52 at a right front overlap joint 62. Similarly, left front section 56 will nest with left center section 58 at left front overlap joint 64. As illustrated in FIG. 2, left front overlap joint 64 is defined as the area of overlap between the two sections. As such, left front overlap joint 64 begins at front end 80 and extends to rear end 82. Due to the differing vertical dimensions between front sections 50, 56, and their corresponding center sections 52, 58, it is advantageous to utilize a spacer 88, 90 to help support front sections 50, 56, within their respective front overlap joints 62, 64. Spacer 88, 90 is referred to as a Z-bar and is configured to nest between a lower portion of the respective deep section and a lower portion of the respective front section. Right front Z-bar 88 and left front Z-bar 90 are illustrated schematically in FIGS. 1 and 2. As illustrated, the relative positions of the front Z-bars 88, 90 abut the rear end of right front overlap joint 80 and left front overlap joint 82. Z-bars 88, 90 create a boxed section when attached to the respective rail section, thus imparting considerable strength—both torsionally and transversely. Similar results could be achieved using similarly configured mounting brackets and/or differently configured spacers (e.g. hollow or "C" shaped components).

Similarly, rear shallow sections 54, 56 are configured to nest within center sections 52 and 58. Right rear overlap joint 66 is formed in the area where right center section 52 overlaps with right rear section 54. Similarly, left rear overlap joint 68 is defined as the area of overlap between left center section 52 and left rear section 60. More specifically, left rear overlap joint 68 is defined between front end 84 and rear end 86. It is also desirable to utilize spacers 92, 94, 96, 98 in the rear overlap areas to bridge the gap between the lowermost portion of center sections 52, 58 and the lowermost portion of the respective rear sections 54, 60, and to provide a sound joint capable of easily transferring loads.

Since more weight will be supported and more forces will be applied in the rear of the vehicle, it is often desirable to have any spacers be more structurally significant than in the front of the vehicle. One way to accomplish this is to use dual spacers 92, 94, 96, 98 within the larger overlap joints 66, 68. Another solution is to use elongated spacers in a larger overlap joints 66, 68. As shown in FIG. 1, a first right rear Z-bar 92 and a second right rear Z-bar 94 are positioned within right rear overlap joint 66. Likewise a first left rear Z-bar 96 and a second left rear Z-bar 98 are positioned within left rear overlap joint 68. First left rear Z-bar 96 is positioned near the front end 84 of left rear overlap joint 68. In other words, first left rear Z-bar 96 is positioned to support a front end of left rear shallow section 60. The second left rear Z-bar 98 is positioned towards rear end 86 of left rear overlap joint 68 and is thus intended to support left rear shallow section 60 throughout the rearmost portion of left rear overlap joint 68. The particular arrangement of the various Z-bars, including their sizes, numbers, and positions can be varied depending upon the intended use of the vehicle frame 10. For example, more than one Z-bar can also be used in front overlap joints 62, 64, and if sufficient support is provided, only one Z-bar may be required in the rear overlap joints 66, 68. Additionally, the length of these Z-bar spacers can easily be varied to span appropriate portions of the overlap joint.

It should also be noted that center sections 52, 58 are provided with front and rear transition areas 70, 72. As shown in FIG. 2, left center section 52 includes a left front transition area 70. Thus, a small part of left center section 52 has a vertical dimension substantially equal to that of the left front section 56. Front transition area 70 represents an angled taper between the areas of differing vertical dimensions. Likewise, left rear transition area 72 provides a smooth transition between areas of differing vertical dimensions. It is desirable to provide areas of the left center section 52 that correspond to the dimensions of the front section 56 and rear section 60 so that as these components are nested, maximum support is achieved. The transition areas 70, 72 are provided to minimize the stress and fracture points that could occur if a more abrupt transition is made. In manufacturing, these transitions are created by changing blanks while continuing to use the same tooling/forms. Obviously, this will reduce tooling and set-up costs.

Figure 3:
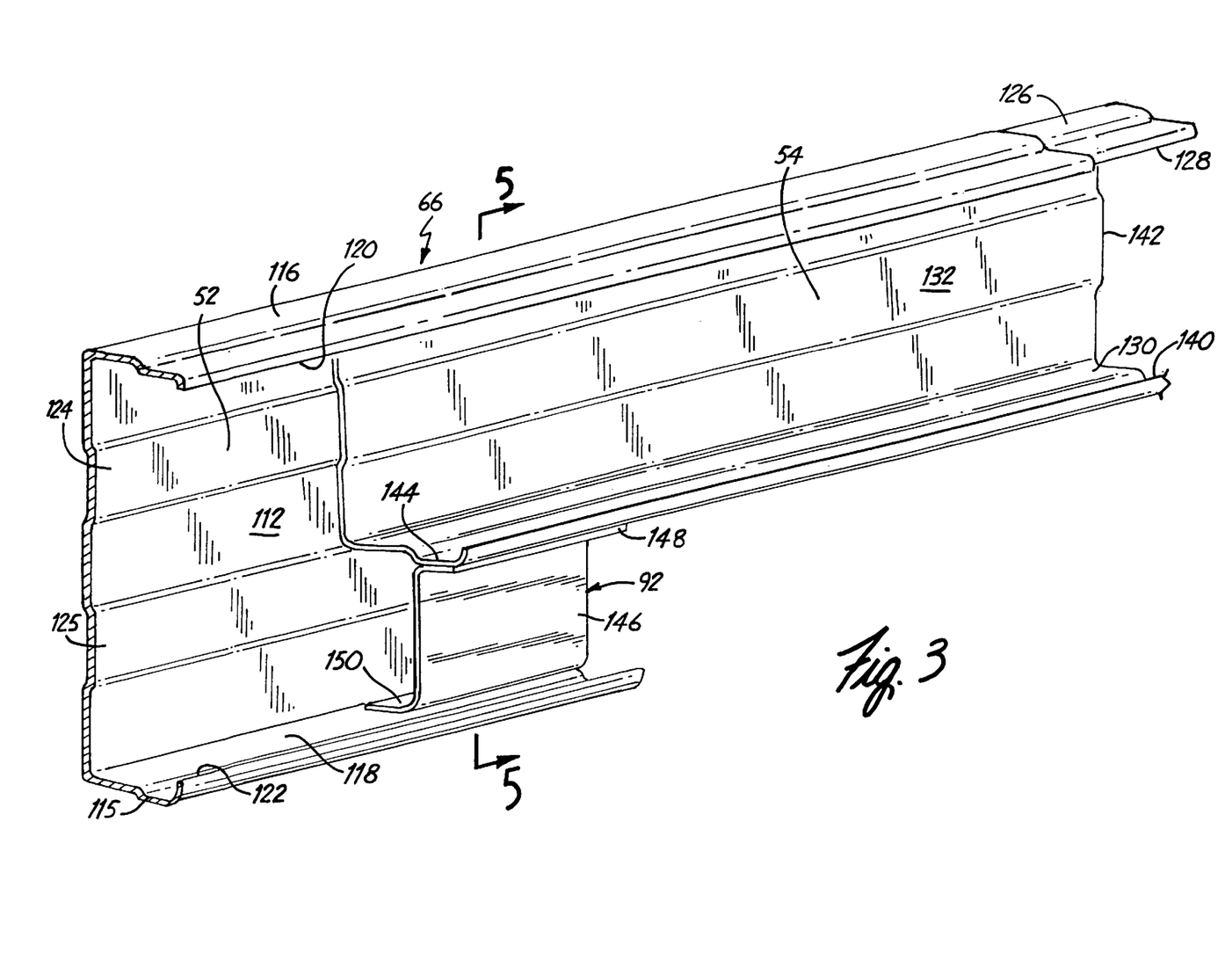
FIG. 3 is a perspective view of one overlap section of the three-piece siderail.

Referring to FIG. 3, right rear overlap joint 66 is illustrated with portions of right center section 52 and right rear section 54. It should be noted that only one Z-bracket 92 is utilized in this overlap joint. As discussed above, two Z-brackets could easily be used. FIG. 3 illustrates some of the structural detail that allows for a multi-piece siderail system to be utilized with medium and heavy trucks. The various sections differ in their vertical (as shown) dimensions, however, they are formed to be similar in their overall shape and structure. With right center section 52, web 112 is disposed between an upper flange 116 and a lower flange 118. In general, web 112, upper flange 116, and lower flange 118 form a generally C-shaped configuration. In addition to this generally C-shaped configuration, upper flange 116 and lower flange 118 have their terminating sections bent towards one another thus forming upper lip 120 and lower lip 122. Providing upper lip 120 and lower lip 122 adds significant structural reliability to the configuration of the right center section 52. Further adding to the structural integrity is a step in both the upper flange 116 and lower flange 118. In FIG. 3 the step is visible as lower step 115 of lower flange 118. Lower step 115 is defined by a crease or bend longitudinally disposed along lower flange 118 and medially subdividing lower flange 118 into two separate planar areas wherein each of the planar areas are parallel, but offset from one another.

Similarly, a plurality of ribs 124, 125 are longitudinally disposed along web 112. Deformation of web 112 forms first rib 124 and second rib 125 extending along web 112. The placement and spacing of ribs 124, 125 transform planar web 112 into a series of protruding and retracting planar sections wherein each one of these sections is substantially similar to the next. Both first rib 124 and second rib 125 increase the strength of web 112 and help to prevent oil-canning, and withstand localized fatigue stresses at fasteners.

Thus, each section of siderail 12, 14 is generally C-shaped having a stepped, lipped flange, and at least one rib extending longitudinally along it. These structural characteristics serve two distinct purposes. First these structural features provide for an integrated nesting between right rear section 54 and right center section 52. For example, right rear section 54 includes an upper flange 126, a lower flange 130, upper lip 128 and a lower lip 140, and a single rib 142 extending longitudinally therealong wherein these components correspond to similar components on right center section 52. As will be more clearly shown in later views, upper flange 126 nests tightly against upper flange 116. Furthermore, the deformation formed by rib 142 provides a recess into which rib 124 of right center section 52 interconnects. Thus, the first important feature that the structural characteristics provide is for the integrated nesting of the various sections to form an integral siderail 12, 14.

The second important feature provided by the structural characteristics is the increased strength which they provide to the various sections. For example, web 112 of right center section 52 must have a relatively large vertical (as shown) dimension in order to provide the required degree of stiffness. Simply providing this deep web 112 as a planar member would subject right center section 52 to a substantial risk of buckling and/or oil canning, especially when using reduced gauge material. This would render the deep web 112 unacceptable for use in medium and heavy truck frame structures. As mentioned above, the inclusion of ribs helps to avoid this problem. Further, the ribs provide reinforced fastener attachment zones at the ribs' vertical center. The stepped, lipped portions of the flanges also provide for increased rigidity and structural support without requiring heavier gauge materials to be used. Thus, each of these characteristics help to increase rigidity and strength, while the combination resulting in the unique configuration of these structural members allows relatively light gauge materials to be used without surrendering the required degree of support and integrity.

Referring to FIG. 3, right rear Z-bar 92 is shown in greater detail. Right rear Z-bar 92 includes a main body 146 with an upper support arm 148 extending in a perpendicular direction away from main body 146. Opposite upper support arm 148 is lower support arm 150 which also extends in a perpendicular direction away from main body 146, but in an opposite direction from upper support arm 148. Hence the cross-section of rear Z-bar 92 is a generally Z-shaped configuration. Lower support arm 150 rests atop lower flange 118 abutting web 112. Upper support arm 146 is positioned to support the lower flange 130 of right rear section 54. Upper support arm 148 and lower support arm 150 are substantially planar sections that are intended to flushly abut respective portions of right center section 52 and right rear section 54. In this manner, lower flange 130 is supported substantially throughout right rear overlap joint 66. Due to the configuration of Z-bar 92, any force applied by lower flange 130 is transferred through Z-bar 92 and is applied to lower flange 118. As previously mentioned, the boxed portion created by the combination of Z-bar 92 and associated sections (center section 52 and rear section 54) transfers these loads very efficiently.

Figure 4:
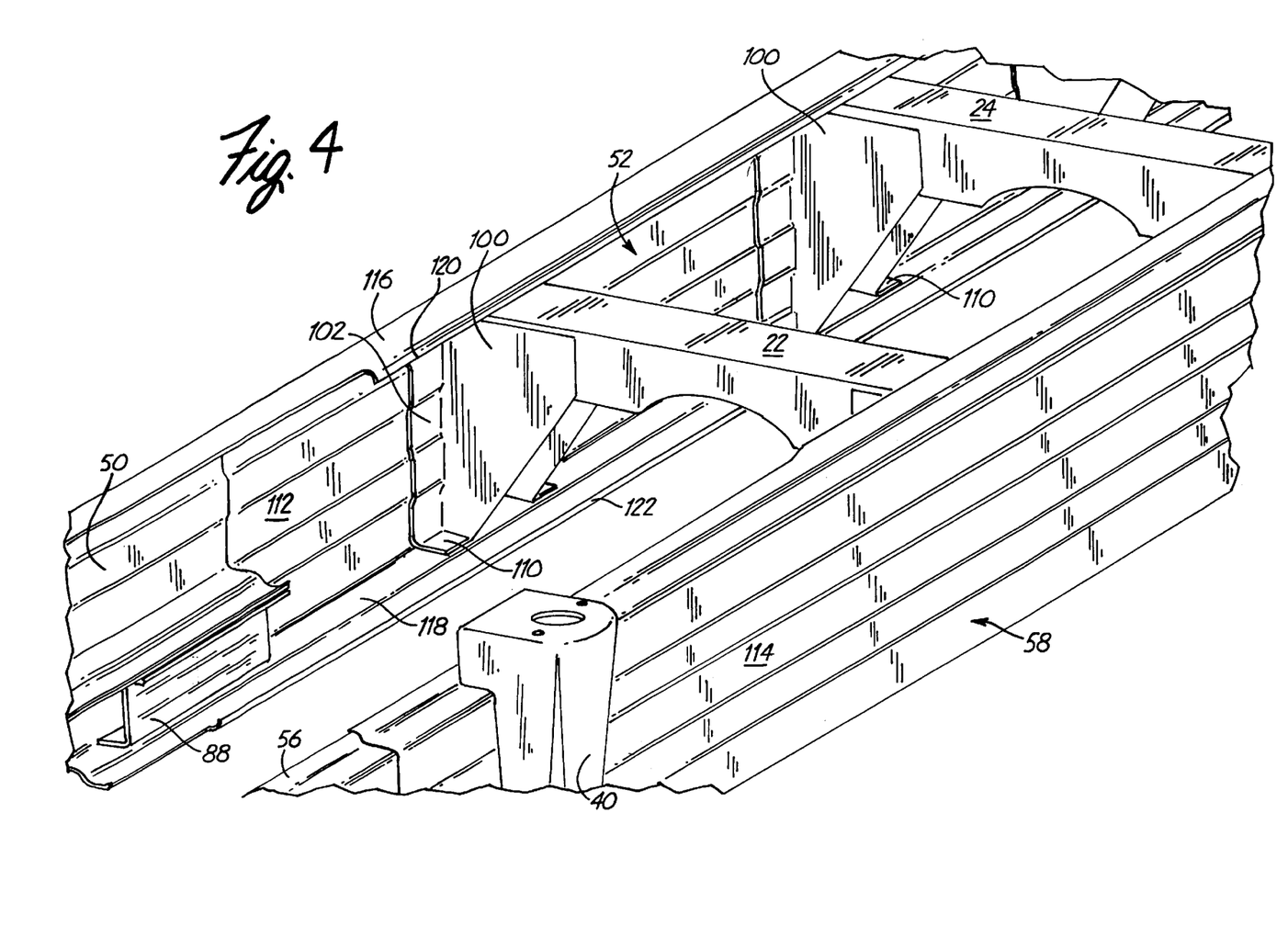
FIG. 4 is a perspective view illustrating the attachment of cross members to the right and left three-piece siderail.

Referring to FIG. 4, right front overlap joint 62 is illustrated along with the area of right front section 50 that intersects right center section 52. A portion of right front section 50 is supported by right front Z-bar 88 in the same manner as described with reference to FIG. 3. Also illustrated in this view are cross member brackets 100 used to support cross members 22, 24. Cross member bracket 100 is configured to have a shape similar to that of web 112 to allow for easy attachment. In other words, cross member bracket 100 includes a ribbed web section 102 and bracket attachment flanges 110. In this manner, cross member brackets 100 are uniquely mated with a corresponding section of frame 10, thus providing increased support and reliability.

Figure 5:
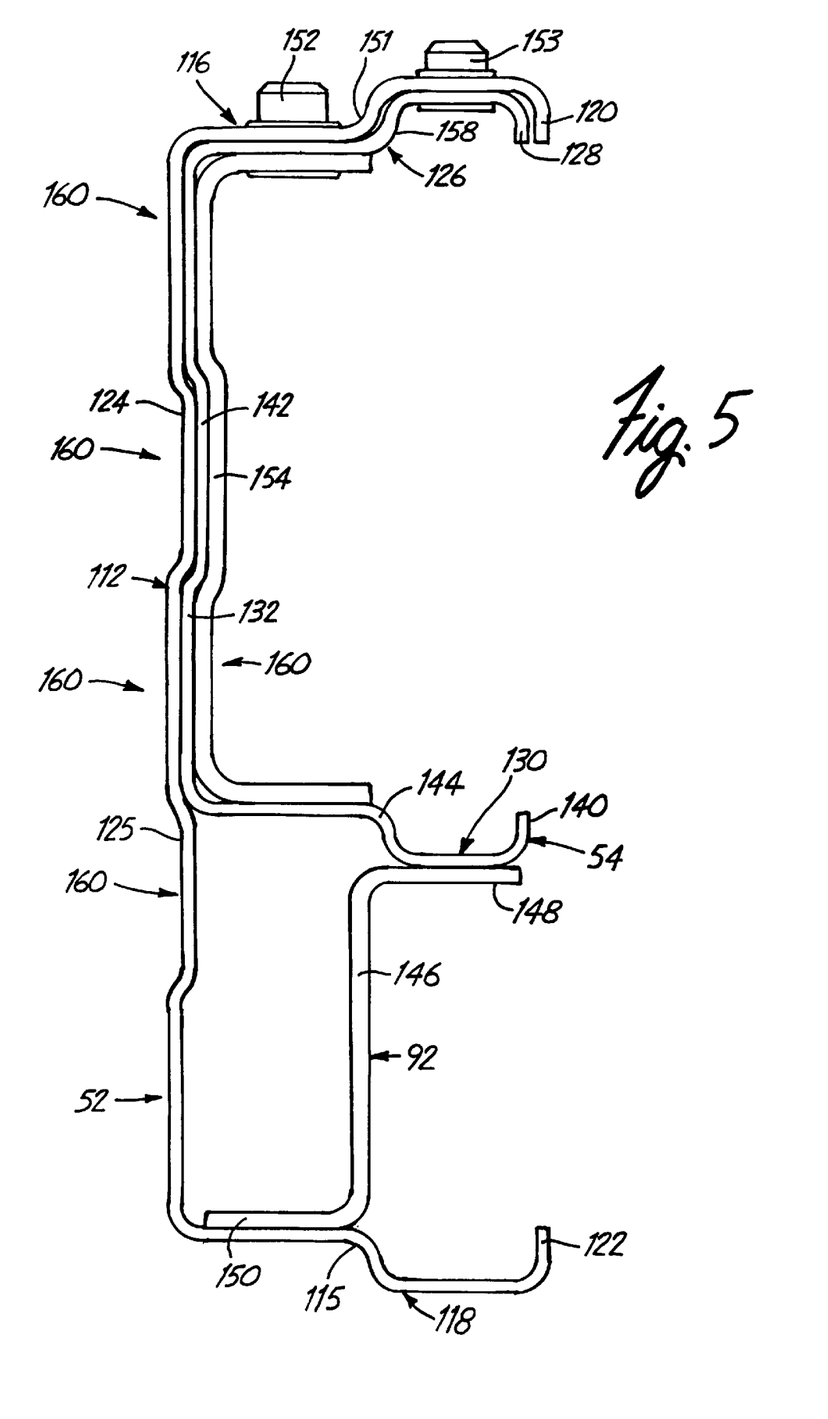
FIG. 5 is a cross-sectional view taken along line 5—5 of FIG. 3 with an internal attachment plate or bracket shown.

FIG. 5 illustrates a cross-sectional view taken along line 5—5 of FIG. 3 and clearly illustrates the nested configuration of the various components. Right center section 52 is provided with upper flange 116 and lower flange 118 wherein upper flange 116 includes upper step 151 while lower flange 118 includes lower step 115. Upper step 151 and lower step 115 produce planar flange portions that are spatially offset from one another while remaining generally parallel. Upper lip 120 and lower lip 122 are inwardly turned portions of upper flange 116 and lower flange 118 that are substantially parallel with webbing 112. As previously described, webbing 112 also includes a first rib 124 and a second rib 125 that form a series of protrusions and recessed portions along webbing 112. Right rear section 54 is shown nested against right center section 52 so that rib 142 of right rear section 54 is nested over first rib 124 of right center section 52. As illustrated, the planar potions of right rear section 54 are substantially flush with the corresponding planar sections of right center section 52. This nesting continues with upper flange 126 which abuts upper flange 116 (i.e. upper step 158 abuts upper step 151). The dimensions of right rear section 54 are selected so that the upper lip 128 of right rear section 54 abuts against and within upper lip 120 of right center section 52.

Although not illustrated in FIG. 3, a support plate 154 as shown in FIG. 5, having a configuration similar to that of right rear section 54 can be inserted to provide additional rigidity and support through part or whole of the overlap joint 66. Alternatively, the end portion of a cross member could be similarly configured to provide support. Since support plate 154 has a similar configuration to that of right rear section 54, the attachment of support plate 154 in this manner will serve to sandwich webbing 132 of right rear section 54 flushly against webbing 112 of right center section 52. Upper support arm 148 of right rear Z-bar 92 supports lower flange 130 of right rear section 54. Lower support arm 150 of right rear Z-bar 92 rests against lower flange 118. Other configurations could be used to provide similar support outside the siderail, or on any portion thereof (e.g. an L-shaped support plate configured to mate with webbing 132 and lower flange 130).

Each exposed planar portion of the illustrated components represents a potential mounting location 160. For example, bolt 152 is shown connecting a portion of support plate 154 with the respective upper lips of right rear section 54 and right center section 52. Bolt 153 connects the respective upper flanges of the deep and shallow sections. The various illustrated components can be held together through bolting as illustrated or any other suitable attachment means such as welding, riveting, or crimping. The potential mounting locations 160 are also utilized to attach various components to the completed frame such as cross member bracket 100 and cab support 40 (as illustrated in FIG. 4).

Figure 6:
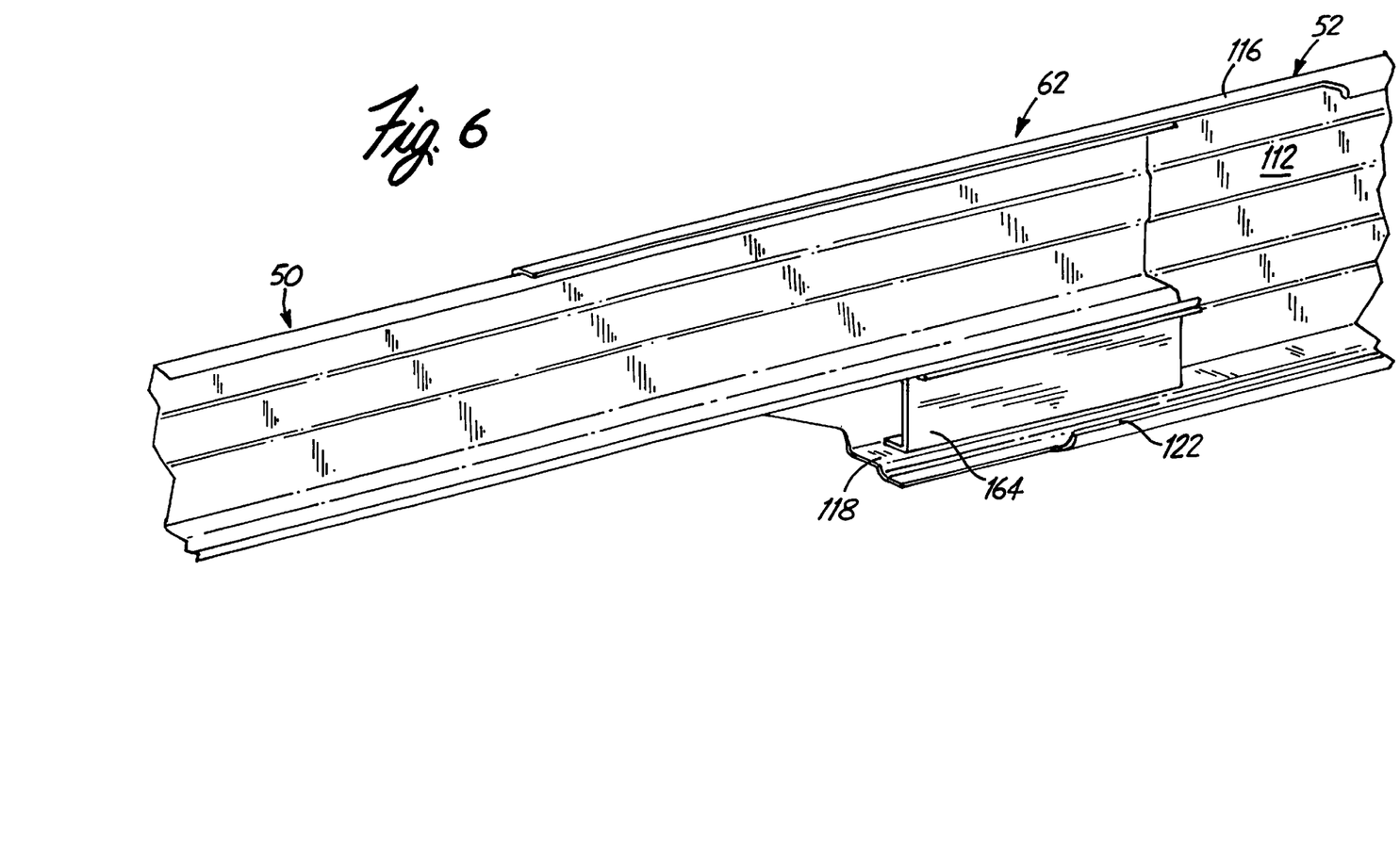
FIG. 6 is perspective view illustrating the interconnection of the right center deep section with the right front section with the use of an elongated Z-bar.
Figure 7:
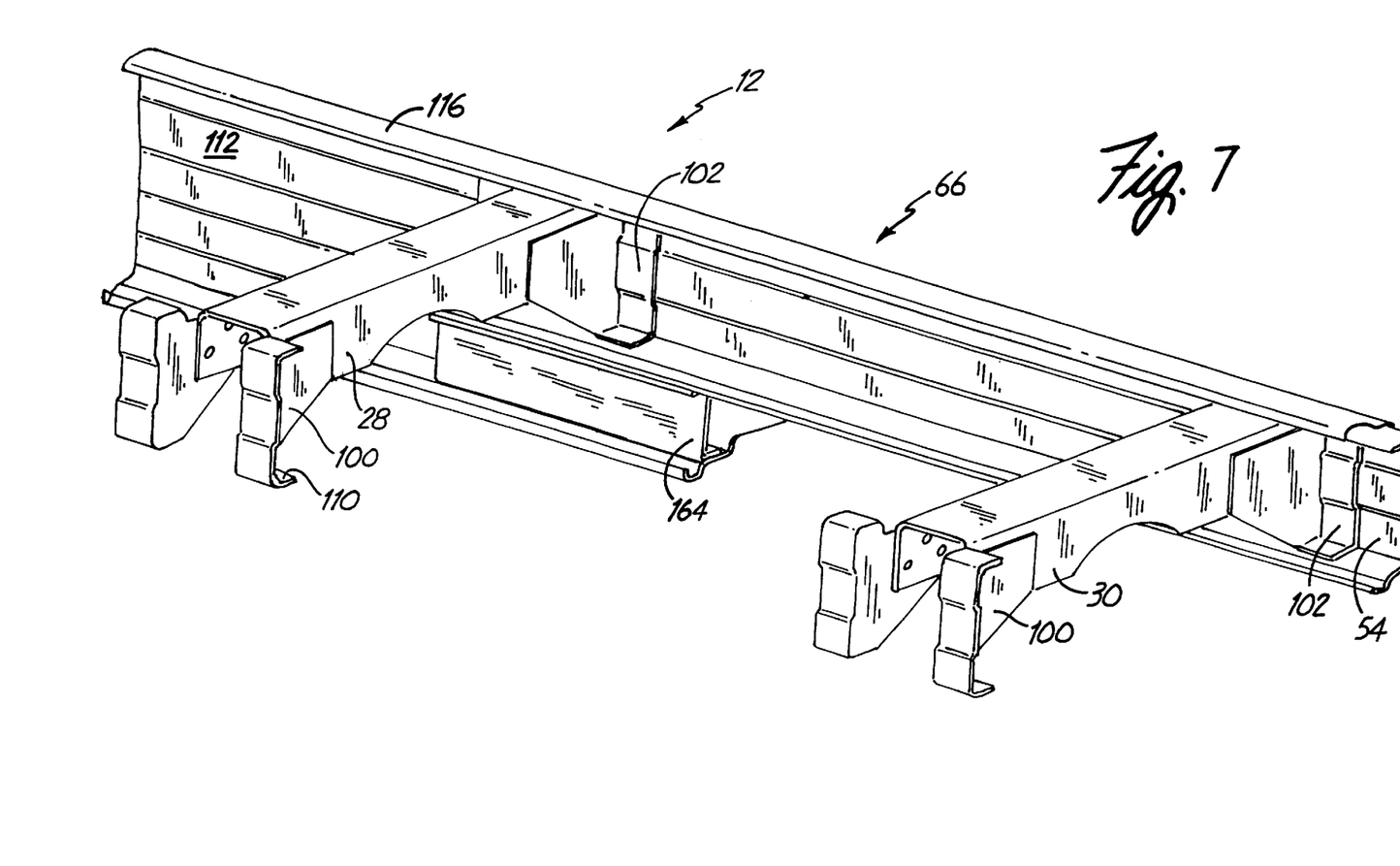
FIG. 7 is a perspective view of the right center deep section interconnected to the right rear shallow section by use of an elongated Z-bar.
Figure 8:
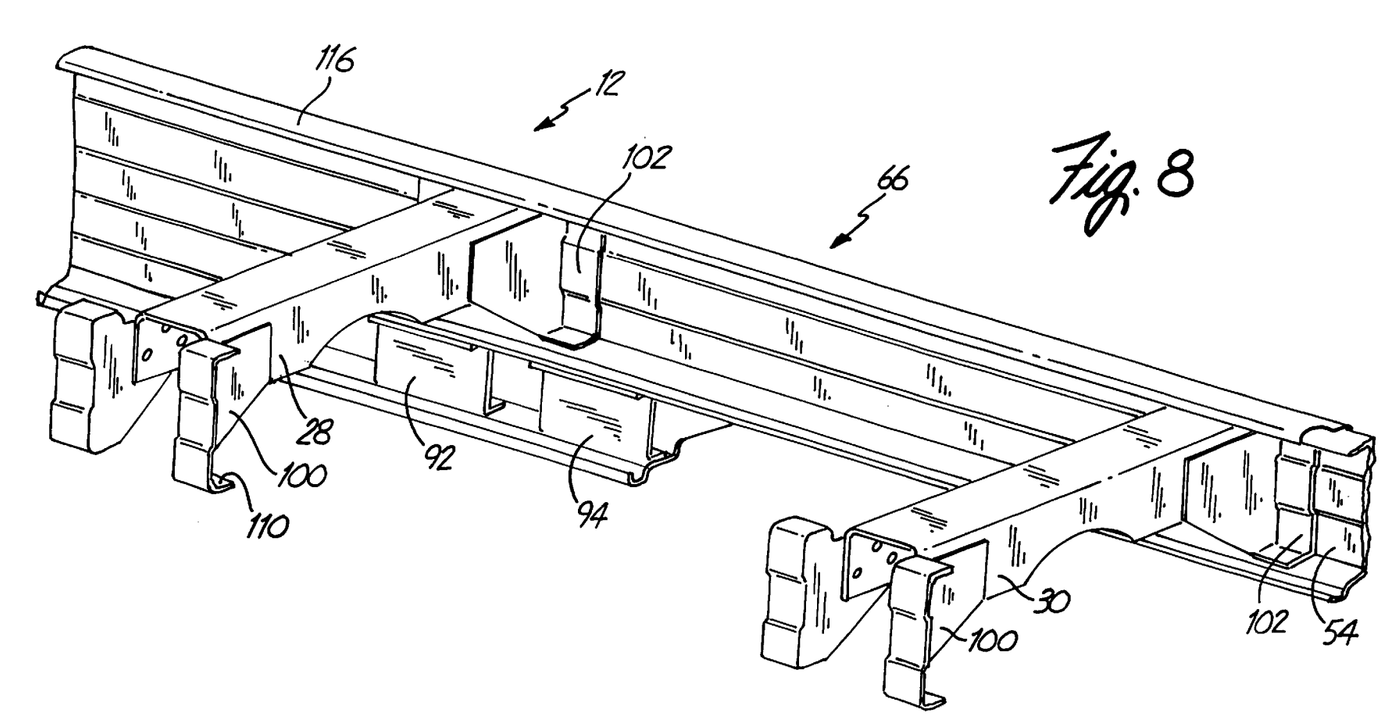
FIG. 8 is a perspective view of the right center deep section interconnected with the right rear shallow section by use of two similar Z-bars.

FIG. 6 illustrates right front overlap joint 62 as well as a portion of right front section 50 and right center section 52. Supporting right front section 50 through right front overlap joint 62 is an elongated Z-bar 164. Structurally, elongated Z-bar 164 is substantially similar to right front Z-bar 88 as previously illustrated. The distinction is that the overall length of elongated Z-bar 164 is substantially greater than right front Z-bar 88. The use of such an elongated Z-bar 164 provides more support to right front section 50 through the right front overlap joint 62. Likewise FIG. 7 illustrates the use of an elongated Z-bar 164 in the right rear overlap joint 66. Thus, for use in frames where more support is required in the rear overlap joints, it is acceptable to use two (or more) independent rear Z-bars 92, 94 or a single elongated Z-bar 164. FIG. 8 illustrates the use of two independent and shorter right rear Z-bars 92, 94.

Although the above discussion has related to medium and heavy trucks, all of the features involved may well be beneficial with light trucks. Consequently, the invention is not intended to be limited to any particular class or type of vehicle.

Those skilled in the art will further appreciate that the present invention may be embodied in other specific forms without departing from the spirit or central attributes thereof. In that the foregoing description of the present invention discloses only exemplary embodiments thereof, it is to be understood that other variations are contemplated as being within the scope of the present invention. Accordingly, the present invention is not limited in the particular embodiments which have been described in detail therein. Rather, reference should be made to the appended claims as indicative of the scope and content of the present invention. The use of two shorter Z-bars allows for the use of a common part in multiple locations on the frame, or the use of common parts throughout a single frame family.

What is claimed is:

1. A multi-piece siderail for use in a vehicle frame, comprising:

a first section having a generally C-shaped cross section formed by a first web, a first stepped, lipped upper flange and a first stepped, lipped, lower flange, wherein the first web includes a first longitudinally extending rib;

a second section having a generally C-shaped cross section formed by a second web, a second stepped, lipped upper flange and a second stepped, lipped, lower flange, wherein the second web includes a second longitudinally extending rib; and a third section formed from an elongated member having a first end and a second end and having a generally C-shaped cross section formed by a third web, a third stepped, lipped upper flange, and a third stepped, lipped lower flange, wherein the third web includes a third longitudinally extending rib, so that a portion of the first section abuts the third section at the first end in a nested manner and a portion of the second section abuts the third section at the second end in a nested manner.

2. The multi-piece siderail of claim 1, further comprising:

a first support member extending between the third stepped, lipped lower flange and the first stepped, lipped lower flange; and a second support member extending between the third stepped, lipped lower flange and the second stepped, lipped lower flange.

3. The multi-piece siderail of claim 2, wherein the first support member is a single bar having a Z-shaped cross section.

4. The multi-piece siderail of claim 2, wherein the first support member includes a plurality of bars having a Z-shaped cross section.

5. The multi-piece siderail of claim 2, wherein the second support member is a single bar having a Z-shaped cross section.

6. The multi-piece siderail of claim 2, wherein the second support member includes a plurality of bars having a Z-shaped cross section.

7. The multi-piece siderail of claim 1 wherein the third section includes a plurality of ribs and the first rib of the first section is nested with one of the plurality of ribs on the third section.

8. The multi-piece siderail of claim 1 wherein the second rib of the second section is nested with one of the plurality of ribs on the third section.

9. The multi-piece siderail of claim 1 wherein each of the first, second and third sections include a plurality of planar areas that abut when the first and second sections are nested with third section, so that the planar areas form mounting locations.

10. The multi-piece siderail of claim 9 further comprising a C-shaped support plate nested against the first section.

11. The multi-piece siderail of claim 9 further comprising a C-shaped support plate nested against the second section.

12. A siderail for use in forming frame for a vehicle comprising:

a front shallow section including an elongated member having a web with a longitudinally extending rib, the rib forming a longitudinally extending protruding planar section and a plurality of longitudinally extending recessed planar sections, the web being disposed between a stepped upper flange having a lip depending therefrom, and a stepped lower flange with a lip depending therefrom, wherein the web has a first predetermined dimension between upper flange and the lower flange;

a rear shallow section including an elongated member having a web with a longitudinally extending rib, the rib forming a longitudinally extending protruding planar section and a plurality of longitudinally extending recessed planar sections, the web being disposed between a stepped upper flange having a lip depending therefrom, and a stepped lower flange with a lip depending therefrom, wherein the web has a second predetermined dimension between upper flange and the lower flange;

a deep middle section including an elongated member having a web with a plurality of longitudinally extending ribs, the ribs forming a plurality of longitudinally extending protruding planar sections and a plurality of longitudinally extending recessed planar sections, the web being disposed between a stepped upper flange having a lip depending therefrom, and a stepped lower flange with a lip depending therefrom, wherein the web has a third predetermined dimension between upper flange and the lower flange, wherein the third predetermined dimension is greater than the first predetermined dimension and the second predetermined dimension, so that a portion of the front shallow section overlaps a first portion of the deep middle section in a nested relationship, forming a first gap between the lower flange of the deep middle section and the lower flange of the front shallow section, and a portion of the rear shallow section overlaps a second portion of the deep middle section in a nested relationship, forming a second gap between the lower flange of the deep middle section and the lower flange of the rear shallow section;

a first support bracket located within the first gap and bracing the lower flange of the front shallow section against the lower flange of the deep middle section; and a second support bracket located within the second gap and bracing the lower flange of the rear shallow section against the lower flange of the deep middle section.

13. The siderail of claim 12 wherein the first and second supports are Z-bars.

14. The siderail of claim 12 wherein the first and second predetermined dimensions are substantially equal.

* * * * *